United States Patent
Takechi et al.

(10) Patent No.: US 8,853,898 B2
(45) Date of Patent: Oct. 7, 2014

(54) ELECTRICAL ROTATING MACHINE WITH IMPROVED HEAT SINK COOLING

(75) Inventors: Atsushi Takechi, Chiyoda-ku (JP); Masao Kikuchi, Chiyoda-ku (JP); Hitoshi Isoda, Chiyoda-ku (JP); Masaki Kato, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 590 days.

(21) Appl. No.: 12/607,608

(22) Filed: Oct. 28, 2009

(65) Prior Publication Data

US 2010/0289352 A1 Nov. 18, 2010

(30) Foreign Application Priority Data

May 13, 2009 (JP) ................. 2009-116398

(51) Int. Cl.
*H02K 9/06* (2006.01)
*H02K 11/04* (2006.01)
*H02K 9/22* (2006.01)
*H02K 19/36* (2006.01)

(52) U.S. Cl.
CPC ............. *H02K 11/048* (2013.01); *H02K 9/22* (2013.01); *H02K 19/365* (2013.01); *H02K 9/06* (2013.01)
USPC .......................................... 310/64; 310/68 R

(58) Field of Classification Search
CPC ............ H02K 9/06; H02K 9/00; H02K 9/02; H02K 9/04; H02K 5/18; H02K 5/20
USPC ............................ 310/60 R, 68 D, 52–65, 263
IPC .................... H02K 9/00, 9/02, 9/04, 9/06, 5/18, H02K 5/20
See application file for complete search history.

(56) References Cited

U.S. PATENT DOCUMENTS

| | | | |
|---|---|---|---|
| 6,218,747 B1 | 4/2001 | Tsuruhara | |
| 7,208,918 B2 | 4/2007 | Shirakawa et al. | |
| 7,242,120 B2 * | 7/2007 | Ikuta et al. | 310/64 |
| 7,358,699 B2 * | 4/2008 | Kikuchi et al. | 310/113 |
| 2004/0263007 A1 * | 12/2004 | Malanga et al. | 310/52 |
| 2005/0237033 A1 | 10/2005 | Shirakawa et al. | |
| 2006/0175906 A1 * | 8/2006 | Hino et al. | 310/1 |
| 2007/0035185 A1 * | 2/2007 | Asao et al. | 310/58 |
| 2007/0182384 A1 | 8/2007 | Shirakawa et al. | |
| 2007/0257568 A1 * | 11/2007 | Akita et al. | 310/64 |
| 2008/0303361 A1 * | 12/2008 | Ito et al. | 310/62 |

FOREIGN PATENT DOCUMENTS

| | | |
|---|---|---|
| JP | 2000-262013 A | 9/2000 |
| JP | 2005-224044 A | 8/2005 |
| JP | 2005-5224044 A | 8/2005 |
| JP | 2005-328690 A | 11/2005 |
| JP | 2006-211835 A | 8/2006 |

* cited by examiner

*Primary Examiner* — Michael Andrews
(74) *Attorney, Agent, or Firm* — Sughrue Mion, PLLC; Richard C. Turner

(57) ABSTRACT

An object of the present invention is to provide an electrical rotating machine that prevents heat generated from a stator winding from being transmitted to an inverter circuit. A rotor having a field winding, and a stator having a stator winding arranged so as to surround the rotor are provided. One end of a rear bracket is connected to the stator, and arranged inside the rear bracket is a heat sink assembly including a heat sink having switching elements for controlling the field winding and the stator winding mounted thereto. The heat sink assembly is fixed to protruding portions protruding from an end surface of the rear bracket.

6 Claims, 8 Drawing Sheets

50   51

151

ELECTRICAL ROTATING MACHINE WITH IMPROVED HEAT SINK COOLING

BACKGROUND OF THE INVENTION

1. Field of the Invention

The present invention relates to an electrical rotating machine usable as a vehicle generator motor for use in an energy-saving automobile such as an idling stop vehicle, and more particularly to an electrical rotating machine having integrated therewith a switching circuit section for controlling a current supplied to a stator winding.

2. Description of the Background

As a general electrical rotating machine for use in a vehicle, a separate type in which an inverter for controlling the electrical rotating machine is mounted in a vehicle separately from the electrical rotating machine has been actually used. In the case of the separate type, a space for accommodating the inverter needs to be secured in a vehicle. In addition, a loss is caused by the length of a harness connecting the electrical rotating machine and the inverter. In order to solve these disadvantages, various types of inverter-integrated electrical rotating machines have been developed.

As a conventional machine, there has been an electrical rotating machine having a power element unit integrated therewith or arranged in the vicinity thereof, in which a plurality of power elements (switching elements) constituting a power element unit, and an inner heat sink and an outer heat sink, which are connected to the power elements, are arranged in a space between a cover arranged on the rear side of a rear bracket and the rear bracket, in a manner to be fixed on an outside surface of the rear bracket via supporting members (see particularly FIG. 1 of Japanese Laid-Open Patent Publication No. 2006-211835, hereinafter referred to as Patent Document 1).

Since the conventional electrical rotating machine is structured as described above, a path of heat, which is generated from the stator winding, passing through a housing that forms a contour, and reaches an inverter circuit, is short. Accordingly, the inverter circuit suffers the heat from the stator winding, and a temperature thereof is increased higher than the specification thereof. The electrical rotating machine thus attempts to meet the specification temperature, resulting in insufficient output performance. Further, since a power circuit unit and a brush holder are arranged outside the rear bracket, a length of the rear bracket in an axial direction is short, and consequently a heat transmission path becomes short. Accordingly, an effect of the heat has been significant.

Further, the surface of the switching elements, the surface having an electrical potential, is directly joined onto the heat sink by soldering or the like, and thus the heat sink also has the electrical potential. Accordingly, when the heat sink is fastened to the housing or the like with screws, an insulating material needs to be interposed therebetween before fastening. The insulating material tends to deteriorate over time, which leads to deterioration in fastening power, and leads to component damage which is accelerated by vibration of a vehicle body.

Further, when the heat sink has an electrical potential, in order to secure safety against collision, a sufficient spatial distance needs to be arranged between a material having no electrical potential such as the housing, and the heat sink, which leads to a problem of upsizing of the entire machine. In order to avoid such upsizing, insulating coating may be applied to the heat sink. However, the insulating coating is expensive, and, in addition, will be deteriorated by salt water. That is, the insulating coating is insufficient from a viewpoint of reliability.

SUMMARY OF THE INVENTION

The present invention has been made to solve the above-described problems, an object of the present invention is to provide a highly reliable compact electrical rotating machine by minimizing transmission of heat generated from a stator winding to an inverter circuit, and by preventing the heat sink from having an electrical potential.

An electrical rotating machine according to the present invention includes a rotor having a field winding, a stator having a stator winding, arranged so as to surround the rotor, a housing having a load side end fixed to the stator, and a heat sink assembly arranged inside the housing, having switching elements for controlling the field winding and the stator winding mounted on a heat sink. The heat sink assembly is fixed on an inner surface of an anti-load side end of the housing, having a supporting member interposed therebetween, the anti-load side end being axially opposite to the load side end with respect to the heat sink assembly.

The electrical rotating machine according to the present invention includes a rotor having a field winding, a stator having a stator winding, arranged so as to surround the rotor, a housing having a load side end fixed to the stator, and a heat sink assembly arranged inside the housing, having switching elements for controlling the field winding and the stator winding mounted on a heat sink. The heat sink assembly is fixed on an inner surface of an anti-load side end of the housing, having a supporting member interposed therebetween, the anti-load side end being axially opposite to the load side end with respect to the heat sink assembly. Therefore, it is possible to elongate a path of heat transmitted from the stator winding to the heat sink without increasing the overall length, in the rotation axis direction, of the electrical rotating machine, and accordingly, it is possible to reduce the effect of the heat on the switching elements.

The foregoing and other objects, features, aspects and advantages of the present invention will become more apparent from the following detailed description of the present invention when read in conjunction with the accompanying drawings.

DETAILED DESCRIPTION OF THE PREFERRED EMBODIMENTS OF THE INVENTION

First Embodiment

Figure 1:
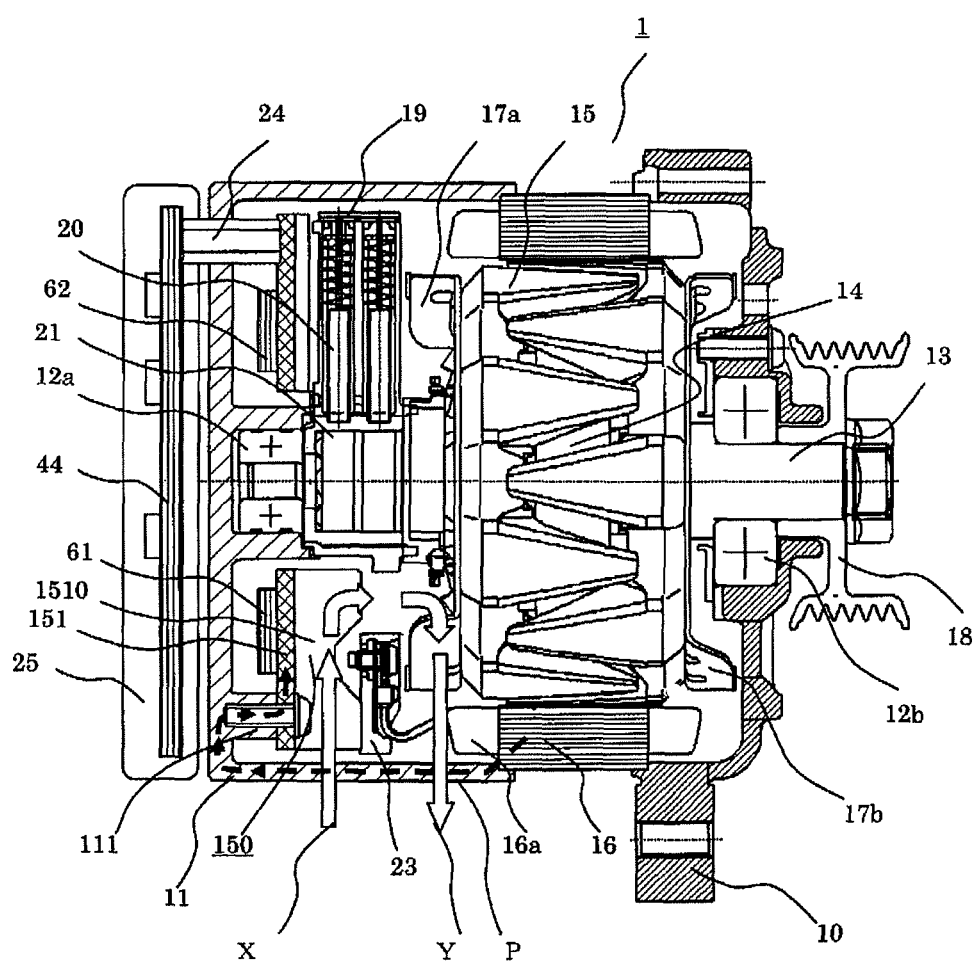
FIG. 1 is a lateral cross-sectional view showing an overall structure of an electrical rotating machine according to a first embodiment of the present invention.
Figure 2:
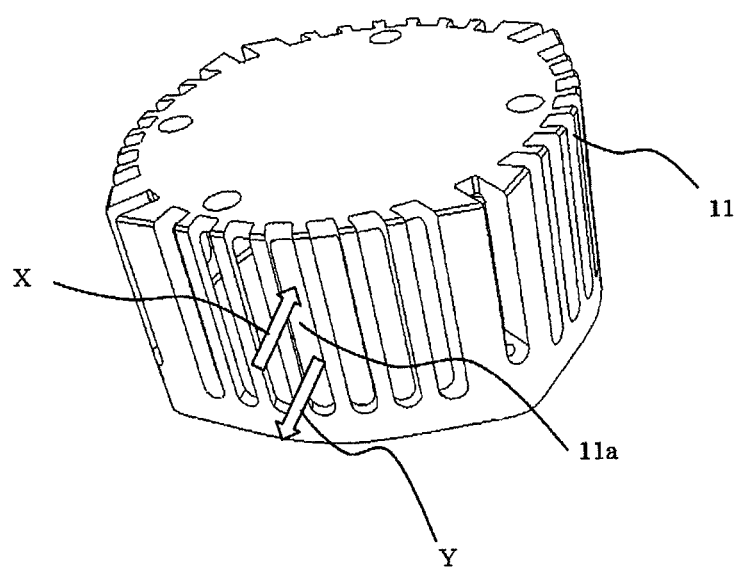
FIG. 2 is a perspective view of a rear bracket.
Figure 3:
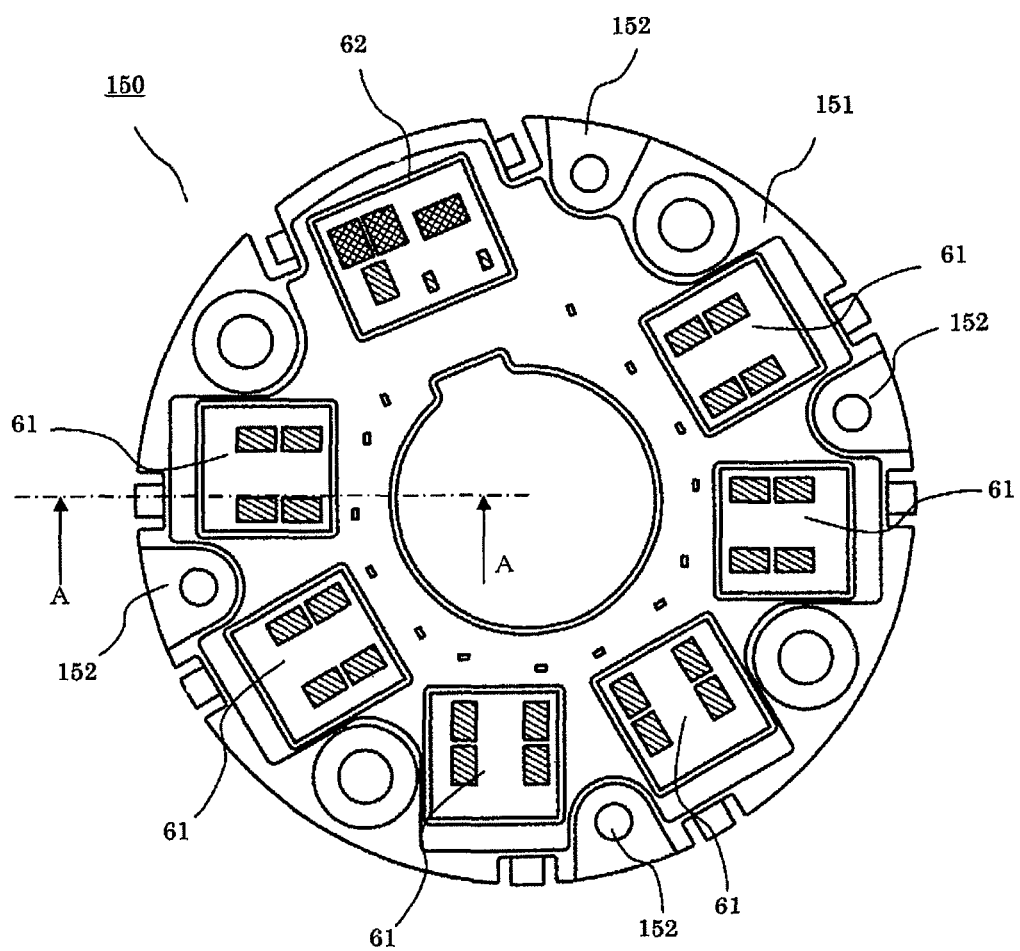
FIG. 3 is a top plan view of a heat sink assembly.
Figure 4:
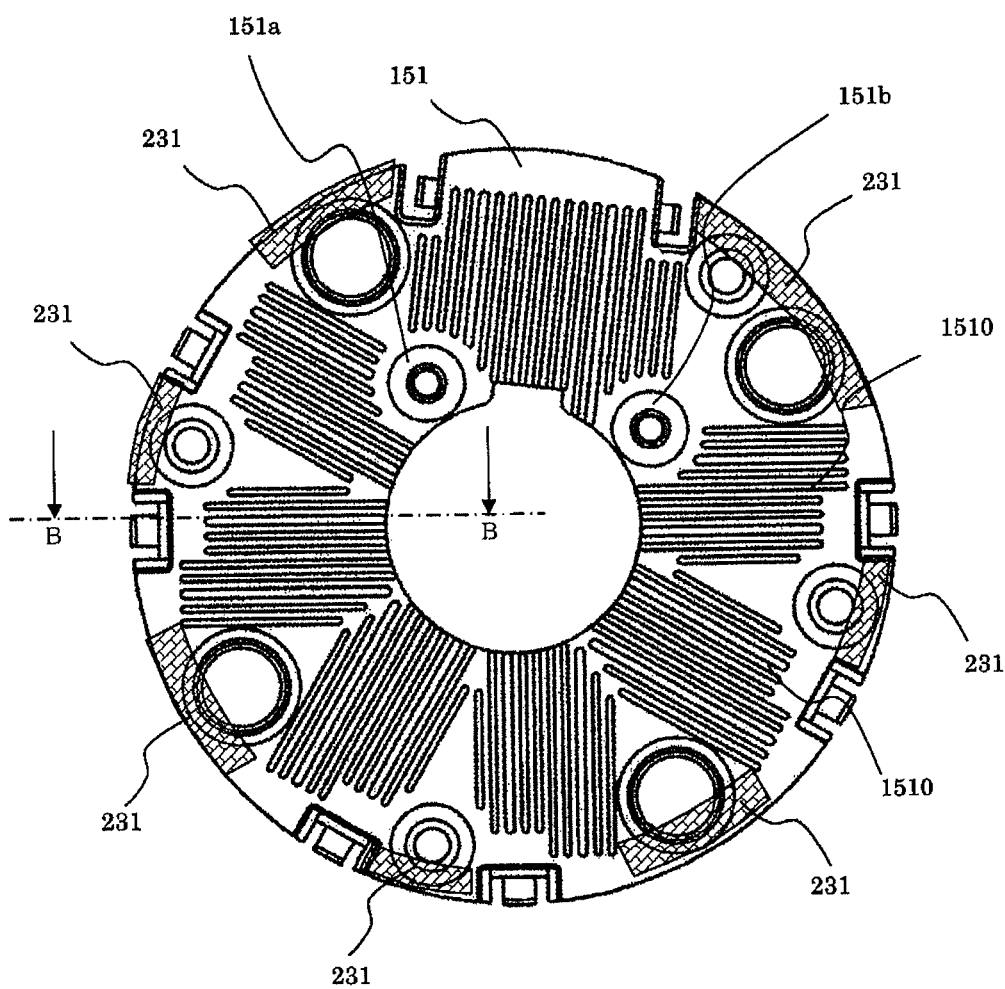
FIG. 4 is a bottom plan view of the heat sink assembly.
Figure 5:
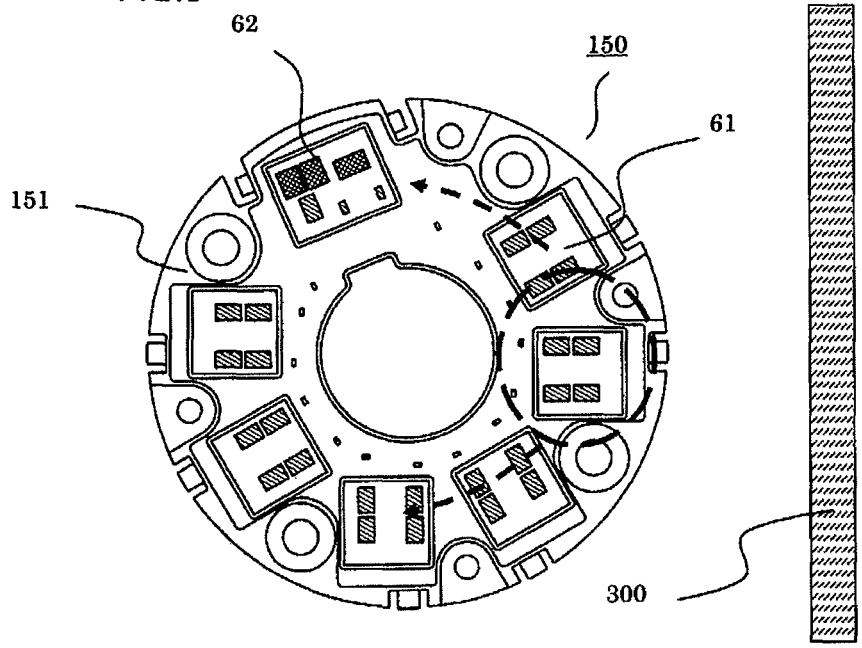
FIG. 5 is a top plan view of the heat sink assembly.
Figure 6:
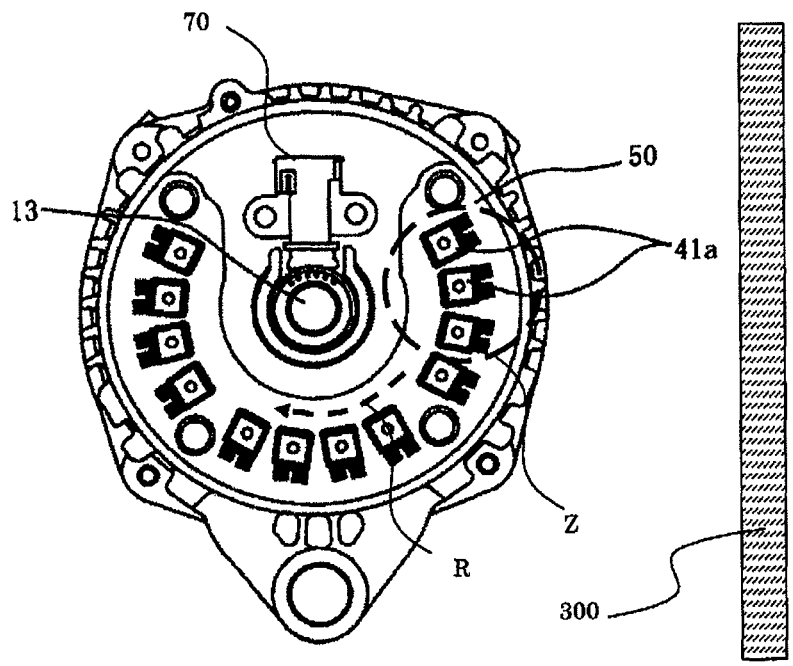
FIG. 6 is a plan view of a sector-shaped heat sink assembly.

Hereinafter, an embodiment of the present invention will be described with reference to drawings. FIG. 1 is a lateral cross-sectional view showing an overall structure of an electrical rotating machine according to a first embodiment of the present invention. FIG. 2 is a perspective view of a rear bracket. FIG. 3 is a top plan view of a heat sink assembly. FIG. 4 is a bottom plan view of the heat sink assembly. FIG. 5 is a top plan view of the heat sink assembly illustrating heat movement. FIG. 6 is a plan view of a sector-shaped heat sink assembly.

In FIG. 1, an electrical rotating machine 1 includes a housing composed of a front bracket 10 and a rear bracket 11, a stator 16 having a stator winding 16a, and a rotor 15 having a shaft (rotation axis) 13 and a field winding 19. The stator 16 is arranged on the load side of the electrical rotating machine 1, and is supported by an end portion of the front bracket 10 and an end portion of the rear bracket 11. The rotor 15 is arranged inside the stator 16 such that the field winding 14 faces the stator winding 16a. The shaft 13 of the rotor 15 is rotatably supported by supporting bearings 12a and 12b which are provided to the housing. The rotor 15 is structured so as to be rotatable coaxially with the stator 16.

On both end surfaces perpendicular to an axial direction of the rotor 15, cooling fans 17a and 17b are fixed. On a front side end of the shaft 13 (outside of the front bracket 10), a pulley 18 is fixed. On a rear side portion of the shaft 13 (inside of the rear bracket 11), a brush holder 19 is fixed to a heat sink 151. A pair of slip rings 21 are mounted on the rear side portion of the shaft 13, and a pair of brushes 20, which is in sliding contact with the slip rings 21, are arranged inside the brush holder 19.

The pulley 18 is coupled with a rotation shaft of an engine via a belt, which is not shown, and rotation of the engine is conveyed to the pulley 18. The brush holder 19, the brushes 20, and the slip ring 21 are designed to supply direct-current power to the field winding 14. The heat sink 151 has an upper surface (surface facing the rear side), on which main power circuits 61 having switching elements, and a field circuit 62 composed of switching elements for controlling power to be supplied to the brushes 20 are mounted, and also has a lower surface (surface facing the front side), on which the brush holder 19 is fixed, whereby a heat sink assembly 150 is structured. The heat sink assembly 150 is fixed to protruding portions 111 which protrude inwardly (toward the stator 16) from an end surface of the rear bracket 11 on an anti-load side. In the above description, a case has been described where the protruding portions 111 are provided on the end surface of the rear bracket 11. However, the protruding portions may be provided on the heat sink 151. Further, an insulating material for blocking heat transmission may be arranged in addition to the rear bracket 11 and the heat sink 151 so as to connect the rear bracket 11 and the heat sink 151 via the insulating material. In short, the heat sink assembly 150 may be fixed onto an inner end surface of the rear bracket 11 by means of a supporting material. Further, a control circuit 44 is arranged inside an external case 25, and a control signal is transmitted from the control circuit 44 to the main power circuits 61 and the field circuit 62 via a connector 24.

When rotation of the engine is transmitted to the electrical rotating machine 1 via the pulley 18, an induced current corresponding to the current supplied to the field winding 14 flows into the stator winding 16a. In this case, the stator winding 16a generates heat due to electrical resistance of the winding. The heat generated from the stator winding 16a is transmitted to the stator 16, then to the rear bracket 11 via a contact portion between the stator 16 and the rear bracket 11, and finally reaches the entire rear bracket 11.

The heat sink assembly 150 is fixed to the rear bracket 11 on the anti-load side, and thus is affected by the heat generated from the stator winding 16a via the rear bracket 11. In the electrical rotating machine 1 according to the present invention, since the heat sink assembly 150 is arranged inside the rear bracket 11, the length of the rear bracket 11 in the axial direction is long, and as shown with a broken-line arrow P in FIG. 1, the path of the heat transmitted from the stator winding 16a is elongated. Further, the heat sink assembly 150 is fixed to the protruding portions 111 protruding from a rear end surface of the rear bracket 11, whereby the path of the heat transmission is elongated, and thus it is possible to further reduce the effect of the heat. In this manner, it is possible to minimize transmission of heat to the main power circuits 61 and to the field circuit 62, and accordingly, sufficient outputs from the main power circuits 61 and field circuit 62 can be ensured, and useless energy consumption can be reduced. Although heat is generated from a current flowing into the field winding 14, the heat is transmitted to the brush 20 via the rotation shaft 13, and then blocked by a space inside the brush holder 19. Thus the heat hardly affects the main power circuit 61 and the field circuit 62.

In FIG. 1, arrows X and Y show flows of cooling air. In the rear bracket 11 shown in FIG. 2, elongated holes 11a used as air paths are open on a side wall of the rear bracket 11 so as to allow an intake air X and a discharge air Y to pass therethrough. Along with the rotation of the rotor 15, the air is discharged from a radially inner side of a fan 17 to an area radially outside thereof, and consequently the radially inner side of the fan 17 changes to a state of negative pressure. An inner side of the electrical rotating machine 1 is divided by a connection relay member 23. Thus, on the heat sink 151 side from the connection relay member 23, the air flows toward radiation fins 1510, and thus the intake air occurs, whereas, the discharge air occurs on the fan 17 side from the connection relay member 23. The heat transmitted from the stator winding 16a is cooled by cooing air, that is, by the intake air X and the discharge air Y while being transmitted through the side wall of the rear bracket 11. Particularly, a portion distant from the stator 16 (a portion where the intake air X flows) corresponds to a radially outer circumference of the main power circuits 61, and is cooled by cooling air before the cooling air cools the main power circuits 61, thus a cooling effect is high in the portion. With this cooling, the heat to be transmitted to the main power circuits 61 is reduced.

The protruding portions 111 are fixed to fixing portions 152 of the heat sink 151, that is, fixed to only four portions, as shown in the diagram. Accordingly, a cross-sectional area acting as the heat transmission path is small, which disturbs heat transmission. Further, since only a few portions are used for fixing, it is possible to secure a wide space on the heat sink 151 for accommodating the main power circuits 61 and the field circuit 62. Further, in the present invention, as shown in FIG. 3, the heat sink 151 is formed in a disc shape having a hole portion such that a shaft 13 is inserted therethrough. Accordingly, the heat sink of such a shape is stronger than that of a sector shape, and is able to secure sufficient vibration resistance even having such a few fixing portions. Further, as shown in FIG. 4, a plurality of radiation fins 1510, which are arranged on a rear surface of the heat sink, the rear surface being opposite to that having the main power circuits 61 and the field circuit 62 mounted thereon, are in a straight-fin shape, and extend toward the center of the radius in parallel to one another. Further, in FIG. 4, the brush holder 19 is fixed with fixing portions 151a and 151b, and the height of the radiation fins 1510, located in an area where the brush holder 19 is fixed, is set lower than that of the radiation fins 1510 located in the remaining area.

FIG. 5 is a top plan view showing a heat sink assembly of the present invention and illustrates heat movement. FIG. 6 is a diagram showing a case where a heat sink is formed in a sector shape. In FIG. 6, the heat sink and a brush holder 70 are placed in an axially common plane, and thus the heat sink needs to be formed in the sector shape. However, in the present invention, since the brush holder is fixed on the rear surface of the heat sink, the heat sink may be formed in a disc shape. In each of FIG. 5 and FIG. 6, an engine outer wall 300 is shown when the heat sink assembly is mounted to the engine. The engine outer wall 300 extends along the vertical direction of the sheet of each drawing. In a positional relation shown in FIG. 6, in the case of the sector-shaped heat sink, the switching elements 41a, which are arranged at an end portion of the sector shape as indicated with a Z portion, have a heat releasing path extending toward only one side of the heat sink as indicated with an arrow R, and thus the temperature of the switching elements 41a tends to rise higher than that of those switching elements which are arranged at the center of the sector shape.

Further, at the time of fixing to the engine, due to the presence of the engine outer wall 300, ambient air on the side of the engine outer wall 300 tends to stagnate, and thus the temperature on the side of the engine outer wall 300 tends to increase compared to that on a side without the engine outer wall 300. In FIG. 6, the switching elements 91a, which are arranged at the end portion of the sector shape where the temperature tends to increase, are also located on the side of the engine outer wall 300 where the temperature tends to increase. Accordingly, increase in the temperature of the switching elements 91a is further accelerated compared to that of the remaining switching elements. In this manner, when the temperature of some of the switching elements is increased locally, the increased temperature hampers an output from the electrical rotating machine, resulting in insufficient output performance. Therefore, in the case of the sector-shaped heat sink and in the case of the positional relation as shown in FIG. 6, an arrangement of the electrical rotating machine needs to be carefully considered such that the end portion of the sector shape is not located on the side of the engine outer wall 300.

On the other hand, the heat sink 151 according to the present invention shown in FIG. 5 is disc-shaped, and thus both of the main power circuits 61 and the field circuit 62 have heat releasing paths extending therefrom toward two sides, respectively. Further, since heat resistance on the left and right sides of each circuit is substantially identical, the heat transmitted from the stator winding 16a, and the heat generated from the main power circuits 61 and the field circuit 62 are spread equally in both side directions. Thus, it is possible to prevent the temperature of particular main power circuits 61 or field circuit 62 from being increased locally.

Further, for example, even in the case where the positional relation of the electrical rotating machine 1 mounted to the engine is as shown in FIG. 5, the heat releasing path on the left and right side directions is secured, and thus a local temperature increase caused by air stagnation can be prevented. Further, since each of the respective main power circuits 61 and the field circuit section 62 is located under an identical circumstance, there is no need to consider an orientation of the electrical rotating machine 1 to be mounted to the engine in order to protect each circuit. Therefore, compared to a case where the heat sink is sector-shaped, there is no need to consider the positional relation of the heat sink with the engine outer wall 300 in terms of heat transmission, even if the engine outer wall 300 is arranged close thereto.

It is often the case that a vehicle body manufacturer requests to locate an external connection terminal, which is used for connection outside the electrical rotating machine, at a desired position based on consideration of efficient vehicle body assembly. On the other hand, a positional relation between the external connection terminal and the main power circuits 61 is restricted to some degree due to an internal design of the electrical rotating machine. Thus, for example, in the case where the orientation of the main power circuits 61 to be mounted is restricted, as is the case of the sector-shaped heat sink, it may be difficult to arrange the external connection terminal at a desired position. However, in the case of the electrical rotating machine according to the present invention, since the heat sink 151 is disc-shaped, there is no need to consider the orientation of the main power circuit 61 to be mounted. Instead, the position of the electrical rotating machine may be determined based on consideration of the position of only the external connection terminal. Thus, it is relatively easy to arrange the external connection terminal at a desired position, and in addition, it is possible to increase the degree of freedom in designing an arrangement of the external connection terminal and the main power circuits 61 in the electrical rotating machine.

Figure 7:
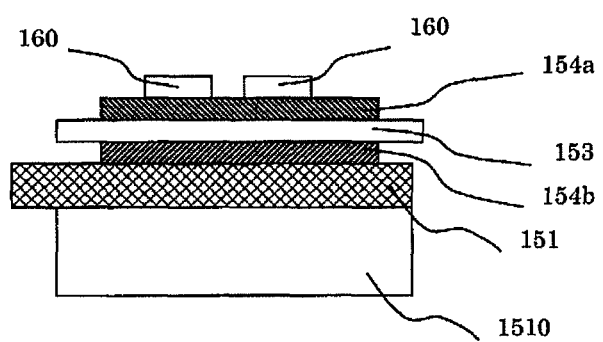
FIG. 7 is a cross-sectional view cut along an A-A line shown in FIG. 3.

FIG. 7 is a cross-sectional view cut along an A-A line shown in FIG. 3, and shows a cross-sectional structure of the power main circuit 61. An insulating substrate (e.g., a ceramic substrate) 153, which has wiring patterns 154a and 154b composed of a conductive metal applied on both sides thereof, is fixed on the heat sink 151 by soldering. Further, semiconductor chips (switching elements) 160 are fixed on the wiring pattern 154a by soldering. Usually, the heat sink 151 is manufactured by aluminum die casting. Since the linear expansion coefficient of aluminum is greater than that of solder, when the heat sink is formed in a sector shape, for example, an end portion of the heat sink is exposed to a high temperature and a low temperature repetitively, and consequently the heat sink expands and contracts repeatedly, which leads to fatigue of the solder and causes cracks therein. As a result, the heat resistance is increased, which hinders transmission of heat generated from the semiconductor chips 160 to the heat sink. On the other hand, in the present invention, the heat sink is formed in a disc shape, which does not have any end portion, and thus it is possible to significantly reduce damage to the solder caused by the thermal expansion.

Second Embodiment

Figure 8:
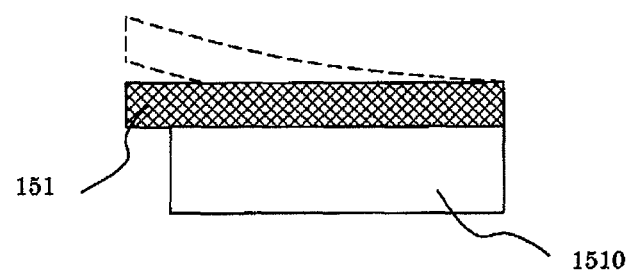
FIG. 8 is a cross-sectional view cut along a B-B line shown in FIG. 4.
Figure 9:
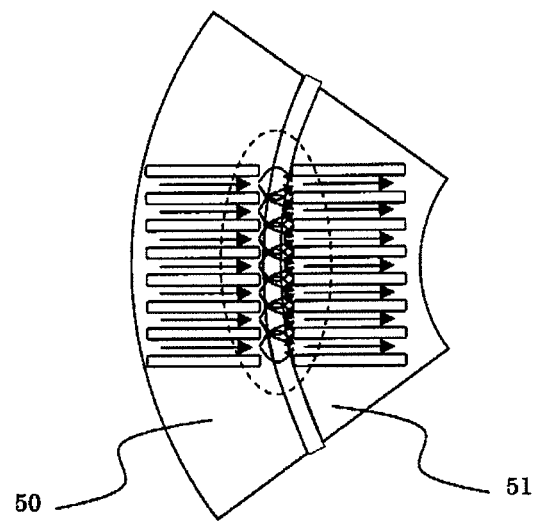
FIG. 9 is a plan view of a heat sink.

As described above, a plurality of radiation fins 1510 arranged on the rear surface of the heat sink as shown in FIG. 4 are formed in the straight-fin shape, and extend toward the center of the radius in parallel to one another. FIG. 8 is a cross-sectional view cut along a B-B line shown in FIG. 4. When a disc-shaped heat sink 151 is subjected to thermal expansion, the heat sink 151 tends to suffer warping as indicated with a broken line shown in FIG. 8.

In this case, the fins in the straight-fin shape according to the present invention have a high section modulus against the warping toward the upward direction, the section modulus being proportional to the cube of the height of each fin. Therefore, it is possible to reduce warping caused by repetitive exposure to a high temperature and a low temperature, and to prevent the soldering from being damaged by the warping. Further, compared to a case where fins are formed in a radial-shape in which each fin extends toward the center, the present invention, in which fins are arranged in parallel to one another, enables increase in an area of the fins, and thus enhances cooling performance.

Therefore, an insulating substrate 153 can be utilized, and the heat sink 151 can be set at a ground potential. That is, when the heat sink 151 has an electrical potential, the heat sink 151 needs to be arranged sufficiently distant from those members which do not have the electrical potential, such as the housing, in consideration of safety against collision. As a result, the entire system is upsized. On the other hand, when the heat sink is subjected to insulating coating in order to avoid such upsizing, costs therefor are increased, and in addition, the heat sink is deteriorated when exposed to saltwater or the like, which leads to a problem of loss of reliability. However, the present invention can eliminate such a problem.

Further, in the case where the heat sink has an electrical potential without the insulating substrate provided thereto, separate heat sinks 50 and 51 need to be arranged for switching elements for an upper arm, and switching elements for a lower arm, respectively. In this case, when a cooling air flows from an outer circumference side toward an inner circumference side, the air path may expand or reduce between the heat sinks 50 and 51 for the upper arm and the lower arm, and consequently a significant pressure loss is caused. As a result, the heat sink 51 on an inner circumference side cannot be cooled sufficiently.

Figure 10:
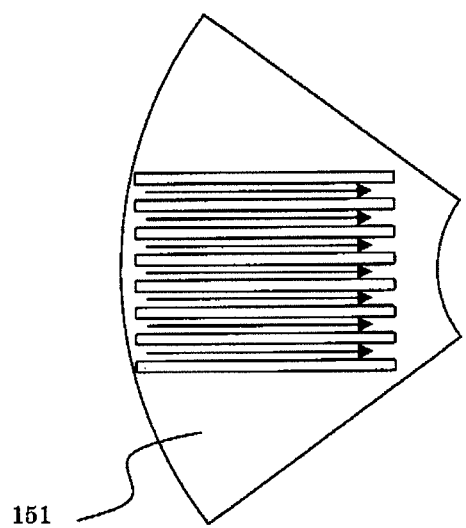
FIG. 10 is a plan view of a heat sink.

On the other hand, the heat sink 151 according to the present invention has a ground potential, and thus the heat sink 151 can be structured in an integrated manner as shown in FIG. 10. Accordingly, expansion or reduction in the air path will not occur, and the cooling air flows smoothly to the center of the heat sink 151. As a result, high cooling performance can be achieved even in the inner side of the heat sink. When such a high cooling performance can be achieved even in the inner side of the heat sink, it is possible to reduce an increase in the temperature.

Figure 11:
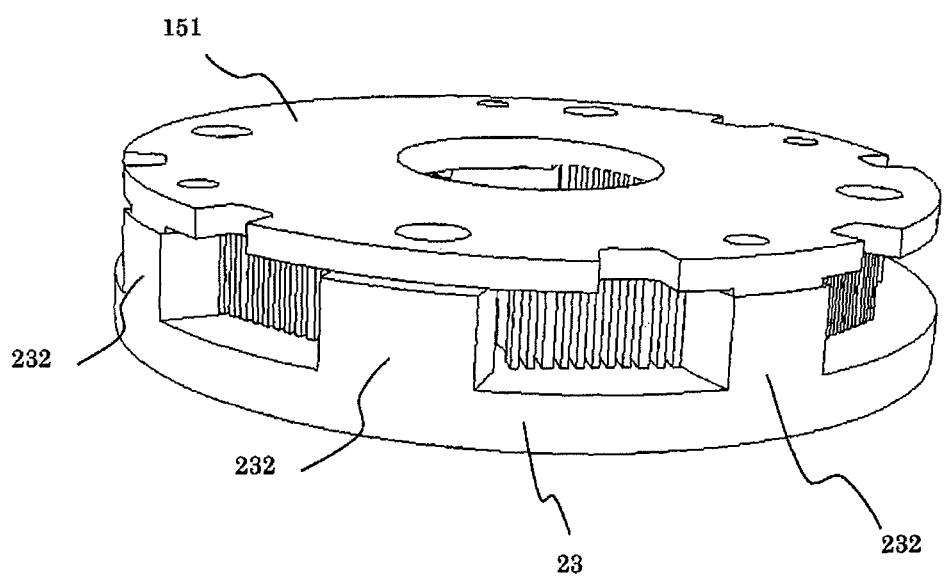
FIG. 11 is a perspective view showing a fixed state between a heat sink and a connection relay member.

FIG. 11 is a perspective view showing a fixed state between the heat sink 151 and the connection relay member 23. The connection relay member 23 supports connecting members to connect the stator winding 16a and the main power circuits 61. There is no radiation fins provided on the inner circumferential side of rib allocation portions 231 shown in FIG. 4, thus when the cooing air is caused to flow so as not to pass through the rib allocation portions 231, the cooling air flows toward the radiation fins in a concentrated manner, and consequently the cooling performance can be enhanced. In the present invention, ribs 232 which restrict the cooling air path are formed on the side of the connection relay member 23 which can be easily manufactured, whereby the cooling performance is enhanced. The heat sink 151 is fixed to the ribs 232, whereby the heat sink 151 and the connection relay member 23 are fixed together.

With the above-described configuration, the heat sink 151 can be easily manufactured by die casting. In addition, since ribs are not formed on the side of heat sink 151, the weight of the heat sink 151 can be reduced even slightly. Accordingly, it is possible to reduce the weight of an electrical rotating machine 1, to improve fuel consumption of the vehicle body, and to reduce energy consumption. Further, although heat from a stator 16 or a rotor 15 will be transmitted more than a little to a heat sink assembly 150 via the ambient air, the connection relay member 23 has an effect of shielding the heat from the stator 16 or the rotor 15 since the connection relay member 23 is structured by resin-molding terminals.

Various modifications and alterations of this invention will be apparent to those skilled in the art without departing from the scope and spirit of this invention, and it should be understood that this is not limited to illustrative embodiments set forth herein.

What is claimed is:

1. An electrical rotating machine, comprising:
a rotor having a field winding;
a stator having a stator winding, arranged so as to surround the rotor;
a housing having a load side end fixed to the stator, and which contains the rotor and the stator; and
a heat sink assembly which is contained inside the housing, and in which switching elements, for controlling the field winding and the stator winding, are mounted on a heat sink of the heat sink assembly, wherein
the heat sink assembly is fixed on an inner surface of an anti-load side end of the housing, having an insulating material for blocking heat transmission interposed therebetween, the anti-load side end being axially opposite to the load side end with respect to the heat sink assembly,
wherein the insulating material only contacts the anti-load side end surface of the housing to provide an elongated path for heat generated by the stator winding.

2. The electrical rotating machine according to claim 1, wherein holes for allowing cooling air to pass therethrough are provided on a side wall of the housing, the side wall corresponding to a radially outer circumferential portion of the switching elements.

3. The electrical rotating machine according to claim 1, wherein an insulating substrate having wiring patterns of a conductive metal applied on both surfaces thereof is interposed between the heat sink and the switching elements.

4. The electrical rotating machine according to claim 1, wherein the heat sink is formed in a disc shape having a hole portion formed therein.

5. The electrical rotating machine according to claim 4, wherein a plurality of radiation fins are arranged on a surface of the heat sink, the surface being opposite to a surface having the switching elements mounted thereon, and the plurality of radiation fins are formed in a straight shape such that the radiation fins extend toward a radial center in parallel to one another.

6. The electrical rotating machine according to claim 5, wherein ribs are formed on a connection relay member that supports connection members for connecting the stator winding to the switching elements, so as to cause cooling air to flow toward the radiation fins in a concentrated manner.

* * * * *